(12) United States Patent
Phillips

(10) Patent No.: US 12,337,746 B1
(45) Date of Patent: Jun. 24, 2025

(54) RACK SYSTEM FOR SECURING CARGO IN PICK-UP TRUCK BEDS

(71) Applicant: Brent M. Phillips, Carefree, AZ (US)

(72) Inventor: Brent M. Phillips, Carefree, AZ (US)

( * ) Notice: Subject to any disclaimer, the term of this patent is extended or adjusted under 35 U.S.C. 154(b) by 770 days.

(21) Appl. No.: 17/584,473

(22) Filed: Jan. 26, 2022

(51) Int. Cl.
  *B60P 7/08* (2006.01)
  *B62D 33/02* (2006.01)

(52) U.S. Cl.
  CPC ........ *B60P 7/0807* (2013.01); *B62D 33/0207* (2013.01)

(58) Field of Classification Search
  CPC ......... B60P 7/0807; B60P 7/0815; B60P 7/08; B62D 33/0207
  USPC ........ 410/101, 102, 106, 108, 110, 115, 116, 410/118, 121, 129, 140; 224/404
  See application file for complete search history.

(56) References Cited

U.S. PATENT DOCUMENTS

| | | | |
|---|---|---|---|
| 4,027,892 A | 6/1977 | Parks | |
| 4,475,855 A | 10/1984 | Chrissy et al. | |
| 6,439,815 B1* | 8/2002 | Liu | B60P 7/0815 410/102 |
| 6,503,036 B1 | 1/2003 | Bequette | |
| 6,604,898 B2 | 8/2003 | Price | |
| 6,648,569 B2 | 11/2003 | Douglass et al. | |
| 6,890,138 B1 | 5/2005 | Myrick | |
| 7,128,341 B1 | 10/2006 | Dahl et al. | |
| 8,303,221 B2* | 11/2012 | Lenz | B60P 7/0815 410/121 |
| 10,850,670 B1 | 12/2020 | Lovins et al. | |
| 2003/0170090 A1* | 9/2003 | Douglas | B60P 7/0892 410/91 |
| 2008/0083352 A1 | 4/2008 | Tovani | |
| 2008/0219795 A1 | 9/2008 | Anderson et al. | |
| 2010/0096872 A1 | 4/2010 | Brogdon | |

FOREIGN PATENT DOCUMENTS

| | | |
|---|---|---|
| AU | 2002300987 A1 | 4/2004 |
| CN | 214420321 U | 10/2021 |

* cited by examiner

*Primary Examiner* — Stephen T Gordon
(74) *Attorney, Agent, or Firm* — Rogowski Law LLC

(57) ABSTRACT

A removable rack system for a pick-up truck bed has a bored panel (such as pegboard) to which retractable pin securements may be joined for lashing cargo to the panel. Footers on the panel keep the panel spaced off the truck bed. Sets of locking wedges brace the panel within the truck bed. The locking wedges at one end contact side edge of the panel and at the opposite end contact the truck bed sidewall. The lengths of the locking wedges are adjustable to force fit the panel within the truck bed without need for fasteners or fixtures that penetrate into the truck bed floor or truck bed sidewalls. The opposite ends of the locking wedges may be configured for joinder to a projection (such as a D-ring) extending from the truck bed sidewall.

21 Claims, 4 Drawing Sheets

RACK SYSTEM FOR SECURING CARGO IN PICK-UP TRUCK BEDS

FIELD OF THE INVENTION

The present invention is generally directed to a rack system installed over a truck bed floor and secured therein with length-adjusting wedges extending from the side edges of the rack system that brace and secure the rack system to truck bed sidewalls.

BACKGROUND OF THE INVENTION

Auto manufacturers offer truck bed liners that seat within pick-up truck beds to prevent scratching or marring the truck bed floor and sidewalls. Over time and with use of the pick-up truck to carry loads, floor and sidewall surfaces of truck beds that do not have a bed liner will be scratched or marred. Many drivers prefer having some barrier over at least the bed floor to protect the truck bed floor from such excessive wear and tear.

Often, factory-installed and after-market truck bed liners are molded thermoplastic structures that are permanently seated over the bed floor and sidewalls. Such bed liners have limited securement points to use when tying down cargo in the pick-up truck bed.

Cargo carried in pick-up truck beds must be secured to prevent unintended release while the truck is moving. Most often, cargo such as furniture, hardware, bicycles, motor bikes and other equipment, is secured with cords, particularly bungie cords, that hook to D-ring projections extending from sidewalls of a truck bed. Or, the bungie cords are joined to the limited securement points provided with after-market bed liners. Sometimes awkwardly shaped cargo requires additional tie down strapping to hold such cargo securely. Pick-up truck beds and truck bed liners usually do not provide securement points on the bed floors.

U.S. Pat. No. 4,027,892 shows a cargo restraining assembly for use in delivery trucks that includes pegboard panels loosely seated over the truck floor and retractable pins that removably seat in the pegboard holes. The retractable pins can include eyelets to which tie down straps are engaged. There is no structure joining the pegboard panels to the truck floor or truck sidewalls.

U.S. Pat. No. 6,503,036 shows a vehicle sliding floor extension and cargo brace having a pegboard panel that slidably engages over a track that is permanently secured to the truck bed floor. Cargo items may be tied to pegs or fixtures that engage with the bores in the pegboard. Similarly, U.S. Pat. No. 6,648,569 shows a vehicle cargo bed with a movable (slidable) platform that may be pegboard. The side edges of the platform engage with a bed liner that has been installed in the pick-up truck bed.

U.S. Pat. No. 10,850,670 shows a removable roller tray that is seated inside a pick-up truck bed. A plurality of caster wheels are joined to the bottom of the tray, and ride within channels provided in the truck bed floor. Lanyards or cords are attached at one end to the roller tray and at the opposite end to a respective D-ring projecting from the sidewall of the truck bed. The roller tray can be rolled over the truck bed back gate to facilitate removing cargo joined to the tray from the truck bed, and the lanyards or cords prevent the tray from being removed entirely out of the truck bed.

Prior pegboard panels either have no connection to the truck bed, which presents safety concerns, or lack the flexibility to be removed easily because they require special tracks or fixtures joining them to the truck bed or to a bed liner. They do not have quick disconnects. Additional improvements to protective barriers for installation over truck beds continue to be sought.

BRIEF SUMMARY OF THE INVENTION

According to one embodiment of the invention, a rack system for a bed of a pick-up truck has a panel defining a plurality of bore holes through the panel thickness that is braced within a truck bed of a pick-up truck. The panel has a left side edge, a right side edge, a front edge and rear edge and defines a thickness. The bore holes may form a regular grid pattern, such as with a pegboard, or may be located in selected regions of the panel.

At least one pair of locking wedges is used to brace the panel between opposite sidewalls of the pick-up truck bed. A first locking wedge of the pair has a first end and an opposite end, and defines a first locking wedge axis between the first end and the opposite end. The first locking wedge has an internally threaded bore with an opening at the first end and extending along a portion of the first axis. The first locking wedge also defines a channel at its opposite end (between two spaced apart arms). The channel is configured to receive a portion of a ring fixture extending from the sidewall of the pick-up truck bed. A bore hole extends through the two spaced apart arms near the opposite end of the first locking wedge. The bore hole defines an axis that is perpendicular to or substantially perpendicular to the first locking wedge axis.

A first externally threaded fastener, such as a bolt, that has a first end and a second end and is threadably joined with the internally threaded bore of the first locking wedge. The second end of the externally threaded fastener contacts either the left side edge or the right side edge of the panel.

A first locking pin is removably insertable into the first locking wedge bore hole and through the first ring fixture extending from the pick-up truck bed. The first locking pin removably secures the first locking wedge to the first ring fixture extending from the sidewall of the truck bed.

A second locking wedge (forming the pair with the first locking wedge), has a first end and an opposite end, and defines a second locking wedge first axis between the first end and the opposite end. The second locking wedge similarly has an internally threaded bore with an opening at the second locking wedge first end and extending along a portion of the second locking wedge first axis. The second locking wedge defines a second locking wedge channel at its opposite end between two spaced apart arms. The second locking wedge channel is configured to receive a portion of a second ring fixture extending from the pick-up truck bed. The second ring fixture extends from the truck sidewall in a position that is opposite from the first ring fixture across the pick-up truck bed. The second locking wedge defines a second locking wedge bore hole near the opposite end and the second locking wedge bore hole has an axis that is perpendicular to or substantially perpendicular to the second locking wedge first axis.

A second externally threaded fastener (such as a bolt) that has a first end and a second end has its first end threadably joined with the internally threaded bore of the second locking wedge. The second end of the second fastener contacts a respective other one of the left side edge or the right side edge of the panel. A second locking pin is removably insertable into the second locking wedge bore hole and through the second ring fixture extending from the pick-up truck bed.

The panel is removably braced between the first locking wedge and the second locking wedge, and held in the bed of the pick-up truck. The wedging or bracing is accomplished by adjusting the length(s) of the portions of the externally threaded fasteners (bolts) that extend from first locking wedge and the second locking wedge. A portion of the length of the first externally threaded fastener that extends out of the first locking wedge may be varied by rotation of the first externally threaded fastener. A portion of the length of the second externally threaded fastener that extends out of the second locking wedge may be varied by rotation of the second externally threaded fastener. The externally threaded fasteners are operatively secured to first and second locking nuts, respectively. Turning each locking nut turns the threaded fasteners and adjusts the overall length of the locking wedges.

In one variant, the locking wedges are provided in pairs, which are positioned opposite one another and have externally threaded fasteners that extend from a first end placed in contact with respective side edges of the panel. The locking wedges of this variant have opposite ends that contact the respective sidewalls of the pick-up truck bed without joining to a D-ring or other projection extending from the truck bed sidewalls. The locking wedges wedgingly brace the panel between the truck bed sidewalls by varying the length extent by which the externally threaded fasteners project out of the respective bores of the locking wedges.

In one advantageous embodiment, a plurality of feet or standoffs extend from the bottom surface of the panel to maintain the panel in spaced apart relation with respect to the truck bed floor.

In another advantageous embodiment, securements (such as rings or D-rings) are provided on or extend from each of the first locking wedge and the second locking wedge. The securements allow cording or tie down straps or bungie cords to be passed through or joined to the locking wedges, providing additional points for lashing or otherwise securing cargo to the rack system.

In still another advantageous embodiment of the invention, at least one retractable pin is provided that is configured to mate with a respective one of the plurality of bore holes of the panel. Preferably, a plurality of such retractable pins are provided. The retractable pins each have a securement projecting therefrom that is configured to receive cording or lashing strapping or bungie cording that may be used to tie down cargo to the panel. The retractable pins have two or more locking bearing detents projecting from a sidewall, so that when the retractable pin is inserted into a bore hole of the panel, the detects spring outwardly to hold the pin in the bore hole. The locking bearing detents may be released by a release button provided on the retractable pin.

The panel may be formed of a material such as pegboard or perforated hardboard, or may be formed of thermoplastic, such as polypropylene, or may be formed of metal, such as steel.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings embodiments of rack systems for installation within pick-up truck beds to facilitate tying down cargo which are presently preferred. It should be understood, however, that the disclosure is not limited to the precise arrangements and instrumentalities shown. In the drawings.

DESCRIPTION OF THE DISCLOSURE

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
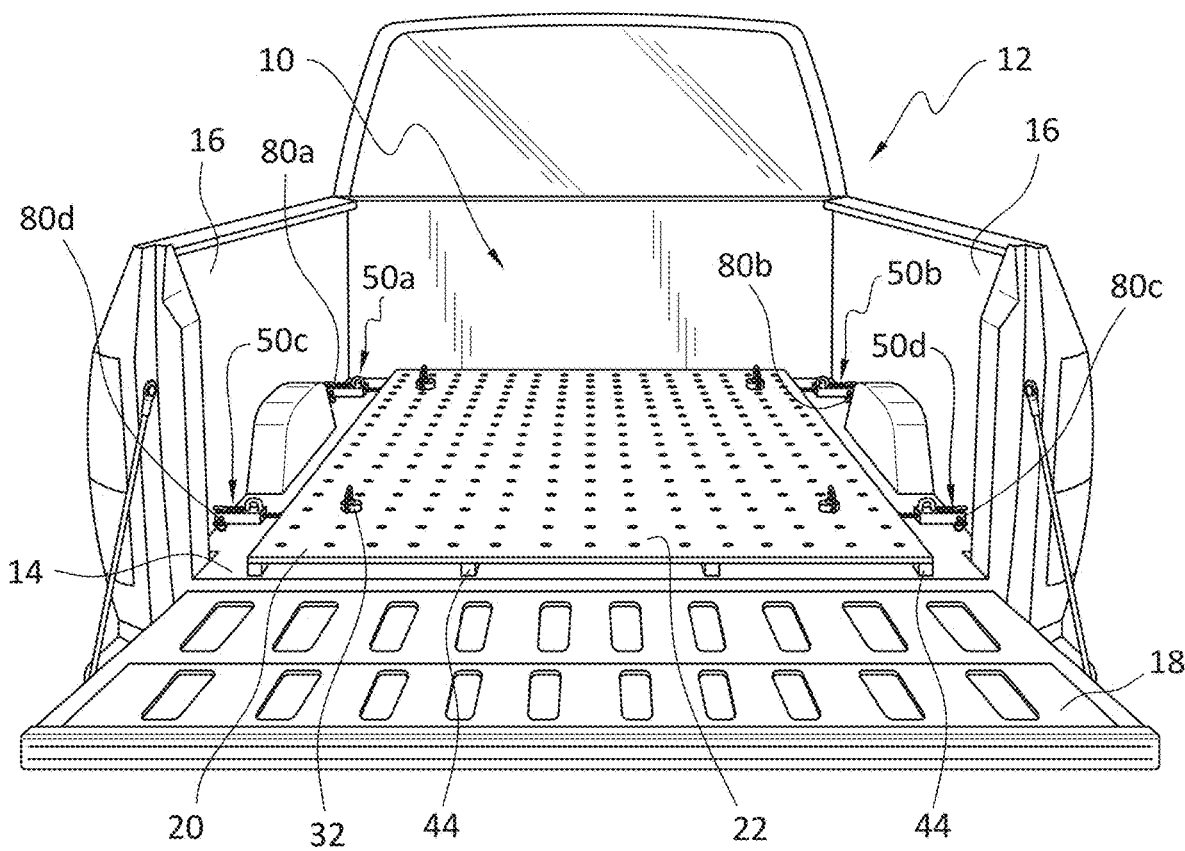
FIG. 1 is a front perspective view of a rack system installed in a truck bed.
Figure 2:
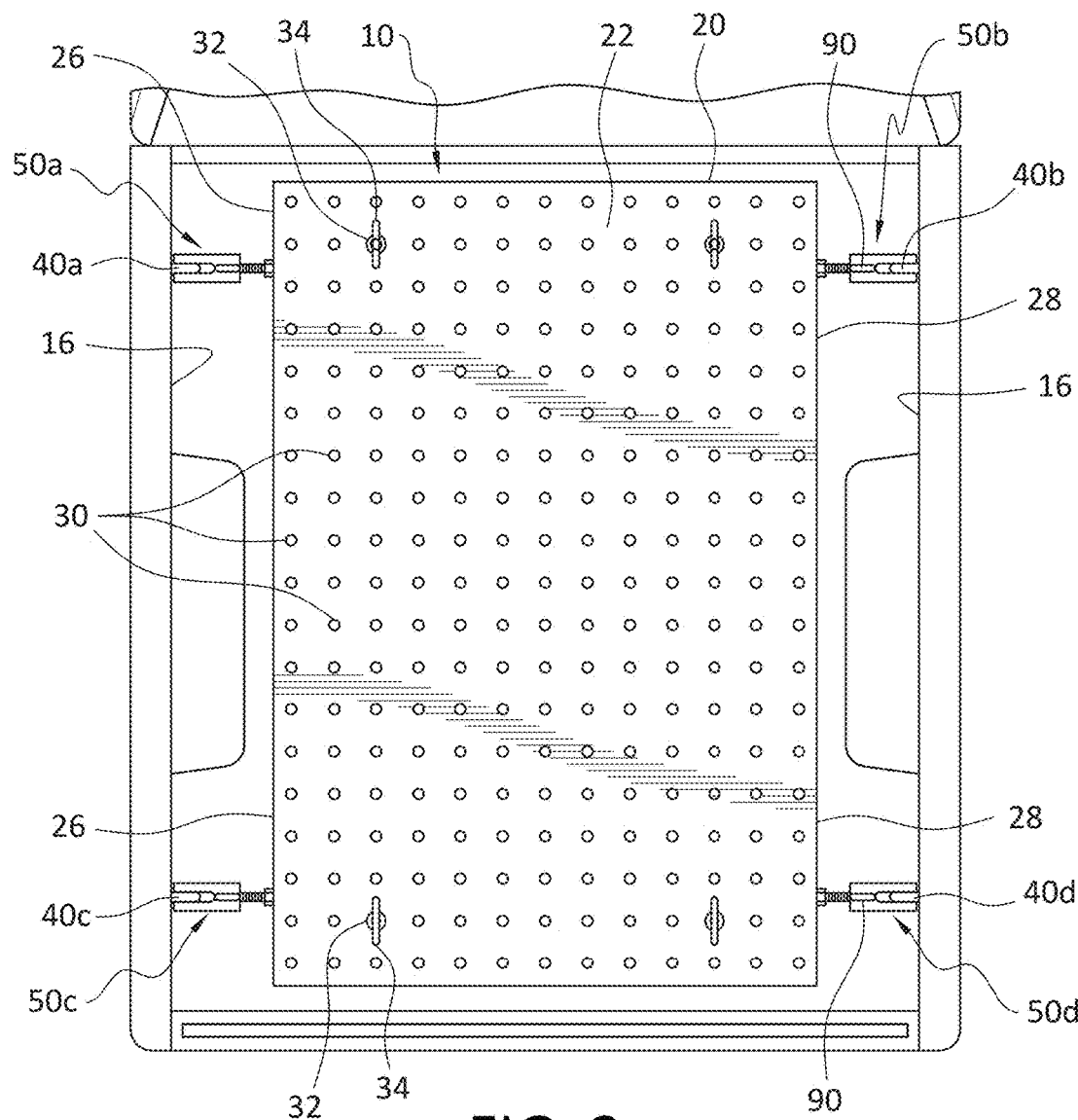
FIG. 2 is a top plan view of the rack system of FIG. 1.
Figure 3:
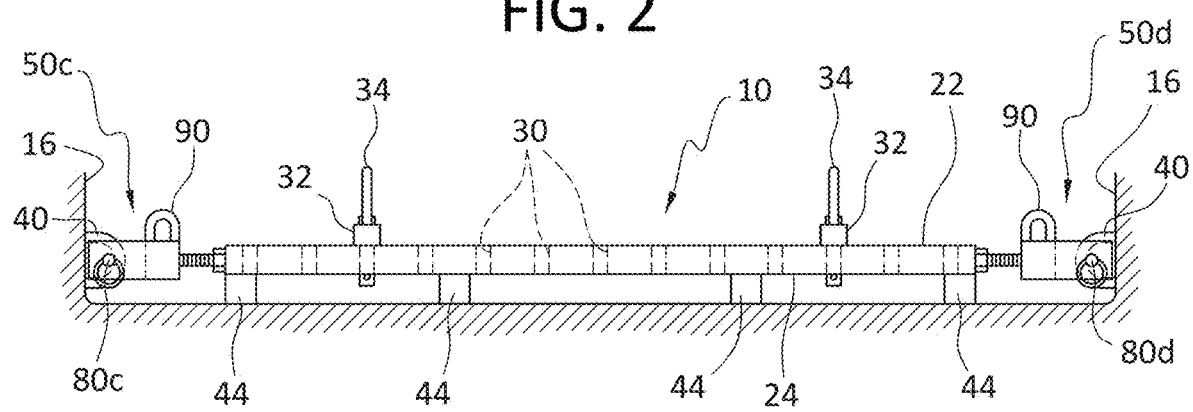
FIG. 3 is an end elevational view of the rack system of FIG. 1.

Referring to the drawings in detail, FIGS. 1-3 show a pick-up truck 12 with a truck bed floor 14 and truck bed sidewalls 16, and a truck bed end gate 18. A rack system 10 according to the invention is installed over the truck bed floor 14 and braced between the truck bed sidewalls 16. The rack system 10 includes a panel 20 with a top surface 22 and a bottom surface 24 opposite the top surface 22. A plurality of bore holes 30 extend through the thickness of the panel 20. See FIG. 3. The panel 20 has feet 44 or stand offs that support the panel 20 over the truck bed floor 14. The panel 20 has a left side edge 26 and a right side edge 28, a front edge and a back edge. The panel 20 is sized to be accommodated within the truck bed.

Figure 5:
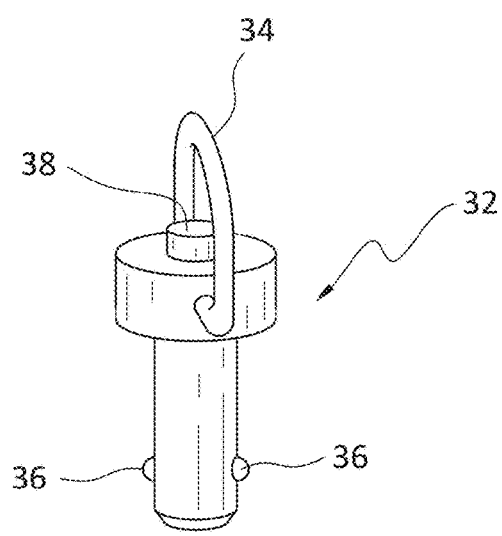
FIG. 5 is a perspective view of a retractable pin securement.

In the embodiment shown in FIGS. 1-3, the bore holes 30 are formed through the panel 20 and spaced across the entirely of the top surface 22. Or in an alternate embodiment, the bore holes 30 may be formed in desired regions across the top surface 22 of the panel 20. The bore holes 30 receive retractable pins 32 that have locking bearing detents 36 to retain a respective retractable pin 32 within the bore hole 30. One advantageous retractable pin 32 is shown in FIG. 5. A securement 34, such as a D-ring, associated with the retractable pin 32 is configured to receive a cord or lashing strap or bungie cord to secure cargo to the panel 20. A respective retractable pin 32 may be seated in a desired one of the bore holes 30 and another respective retractable pin 32 may be seated in a desired different one of the bore holes 30 so that cargo can be tied down and secured to the panel using the multiple retractable pins 32 combined with cord or lashing strap or bungie. The retractable pins 32 have release buttons 38 to release the locking bearing detents 36 when a user wishes to remove a retractable pin 32 from a respective bore hole 30.

The panel 20 is wedged or braced within the pick-up truck bed using a plurality of locking wedges 50. Preferably, locking wedges 50 are deployed in pairs, with a first locking wedge 50a contacting the left side edge 26 of the panel 20, and with a second locking wedge 50b contacting the right side edge 28 of the panel 20. In the embodiment shown in FIGS. 1 and 2, there are two pairs of locking wedges 50S, 50b, 50c, 50d.

Figure 4:
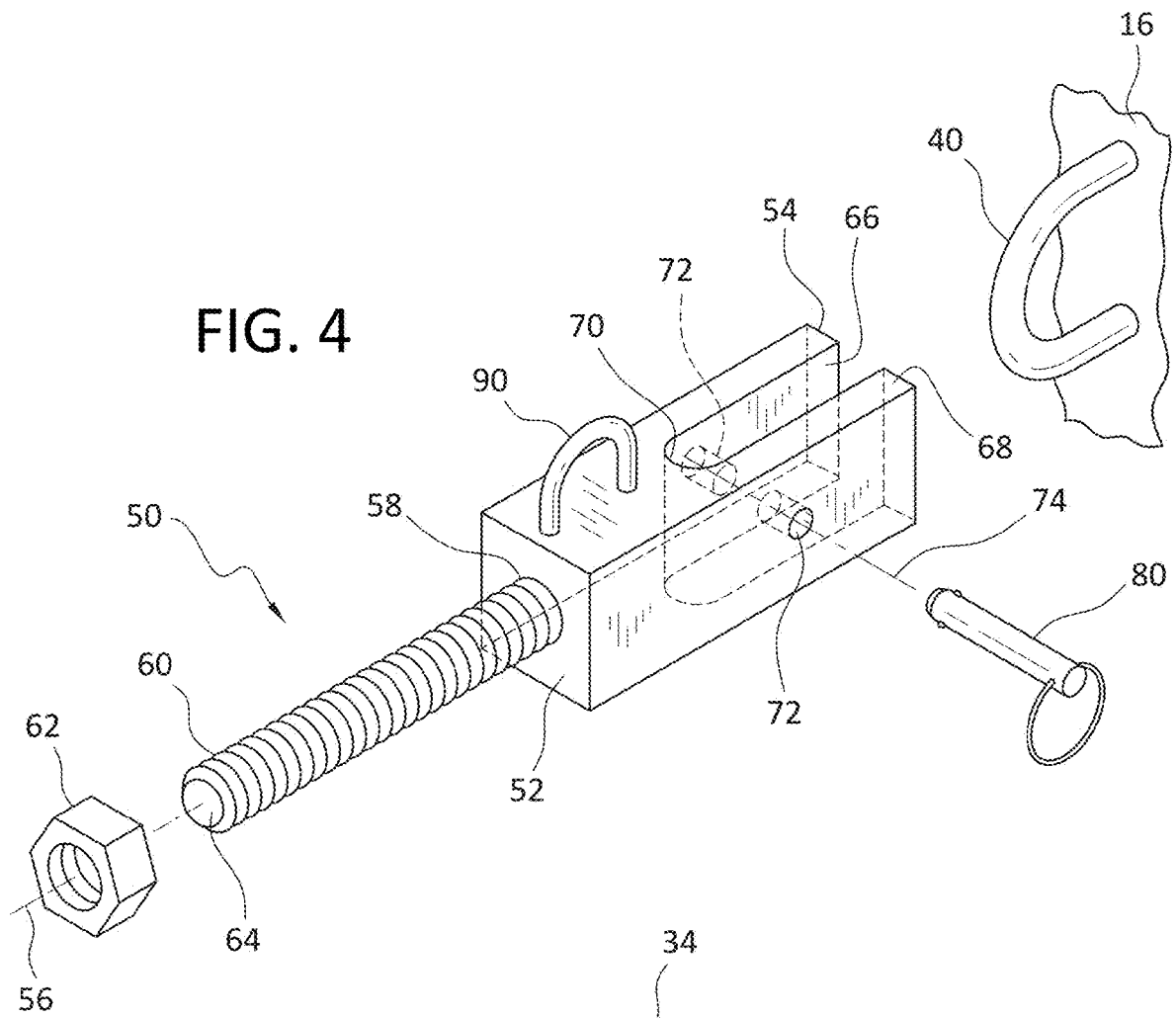
FIG. 4 is an exploded view of a bed locking wedge for a rack system, along with a D-ring extending from a truck bed sidewall.

FIG. 4 shows an enlarged view of a respective one of the locking wedges 50. Each locking wedge 50 has a first end 52, and an opposite end 54. Each locking wedge 50 defines an axis 56, and has an internally threaded bore 58 extending along the axis 56 into the locking wedge, with the internally threaded bore opening at the first end 52. The internally threaded bore 58 is configured to mate with a threaded fastener 60, such as a bolt as shown in FIG. 4, that may be loosened or tightened by turning a locking nut 62 engaged thereto. The first end of the threaded fastener 60 is matingly secured to the internally threaded bore 58 and the opposite end 64 of the threaded fastener 60 contacts a side edge (either the left side edge 26 or the right side edge 28 of the panel 20). The length of the threaded fastener 60 extending out of the threaded bore 58 is adjusted by turning the locking nut 62.

The opposite or second end 54 of the locking wedge 50 has a first arm 66 spaced apart from a second arm 68 to form a channel 70 between the first arm 66 and the second arm 68. The channel 70 is sized to fit over a D-ring or other ring fixture 40 that projects from a sidewall 16 of the pick-up truck bed. A bore hole 72 is formed through the first arm 66 and through the second arm 68. The bore hole 72 defines an axis 74. The axis 74 of the bore hole is at an angle to the axis 56 of the locking wedge 50. In the embodiment shown, the axis 74 of the bore hole 72 is perpendicular to or substantially perpendicular to the axis 56 of the locking wedge 50.

A removable locking pin 80 is inserted into the bore hole 72 and through the D-ring or other ring fixture 40 to maintain a connection between the locking wedge 50 and the D-ring or other ring fixture 40. The removable locking pin 80 is first inserted into the bore hole 72 through the second arm 68 and then through the opening defined by the D-Ring 40 and then through the bore hole 72 of the first arm 66. In this manner the first arm 66 is held to one side of the D-Ring 40 and the second arm 68 is held to the other side of the D-ring 40.

Optionally, a securement, such as a ring or D-ring 90 projects from an external surface of each locking wedge 50. In this manner, cargo may be lashed to the rack system 10 not only by lashing to the securements 34 of retractable pins 32 mating with the bore holes 30 through the panel 20, but also by lashing with cable or strapping or bungie cords to the securement 90 on the locking wedge 50.

To install the rack system 10, a user first engages a first pair of locking wedges 50sa, 50b to a first set of securements (D-rings) 40a, 40b extending from the sidewalls 16 of the pick-up truck bed. The first set of securements 40a, 40b are positioned opposite one another across the pick-up truck bed. A removable locking pin 80s is inserted through the respective bore hole 72 of the first locking wedge 50s, and a removable locking pin 80b is inserted through the respective bore hole 72 of the second locking wedge 50b. Preferably, the user next engages a second pair of locking wedges 50c, 50d to a second set of securements (D-rings) 40c, 40d extending from the sidewalls 16 of the pick-up truck bed using removable locking pins 80c, 80d. The second set of securements 40c, 40d are positioned opposition one another across the pick-up truck bed. The panel 20 is then positioned between the first pair of locking wedges 50s, 50b so that the left side 26 of the panel 20 contacts the end of the threaded fastener 60 of the first locking wedge 50a and the right side 28 of the panel 20 contacts the end of the threaded fastener 60 of the second locking wedge 50b. The locking nuts 62 of the respective first locking wedge 50s and second locking wedge 50b are tightened to wedgingly secure or brace the panel 20 between the first locking wedge 50a and the second locking wedge 50b. Similarly, the left side 26 of the panel 20 and the right side 28 of the panel 20 are wedgingly secured or braced between the second pair of locking wedges 50c, 50d.

The braced panel 20 remains spaced above the bed floor 14 of the pick-up truck bed, and is supported by feet 44 or stand offs extending outwardly from the bottom surface 24 of the panel. The braced panel 20 is securely engaged in the pick-up truck bed without need for penetrating fasteners into the truck bed floor 14 or the sidewalls 16 or the end gate 18. Unlike truck bed liners, the braced panel 20 may be unsecured and removed from the truck bed when not in use.

The panel 20 may comprise pegboard of wood, a wood composite or of a metal, such as steel, or may comprise a molded thermoplastic sheet, such as polypropylene. If pegboard, the panel 20 may have a thickness of from ¼ to ½ inch, and round bore holes 30 with diameters from 3/16 to ⅓ inch, preferably ¼ or 9/32 inch. The round bore holes 30 may be spaced apart on 1-inch centers forming a regular grid. It is also envisioned that the bore holes may be configured with other shapes, such as but not limited to square holes, if desired. Pegboard is sometimes referred to as perforated hardboard.

The panel 20 is illustrated herein with a rectangular top surface 22. It is envisioned that the panel alternatively may be configured with shaped side edges so that the panel fits or seats around wheel well walls that may extend into the pick-up truck bed. Moreover, multiple panels may be braced into a truck bed using the locking wedges according to the invention.

Figure 6:
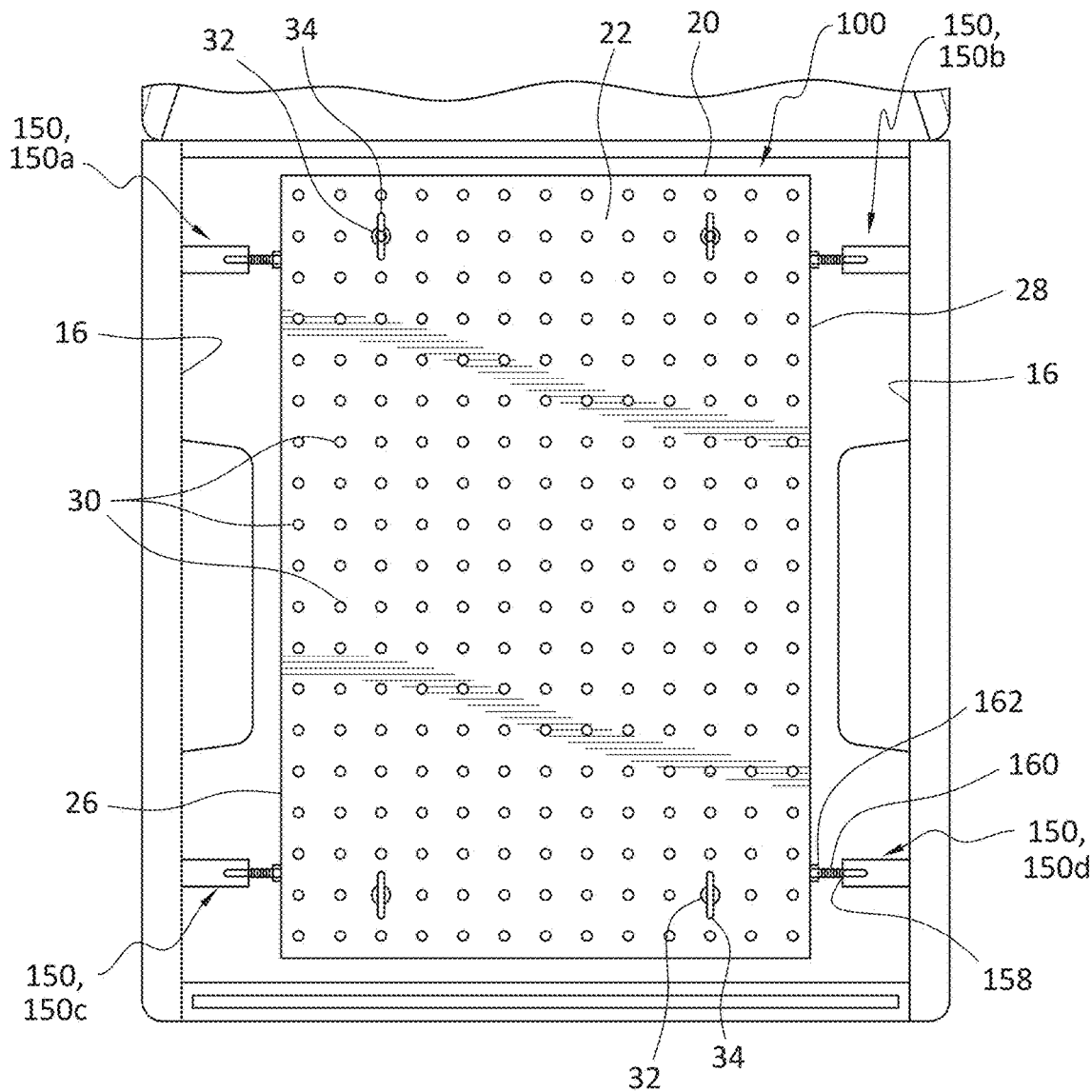
FIG. 6 is a top plan view of a second embodiment of a rack system installed in a truck bed.
Figure 7:
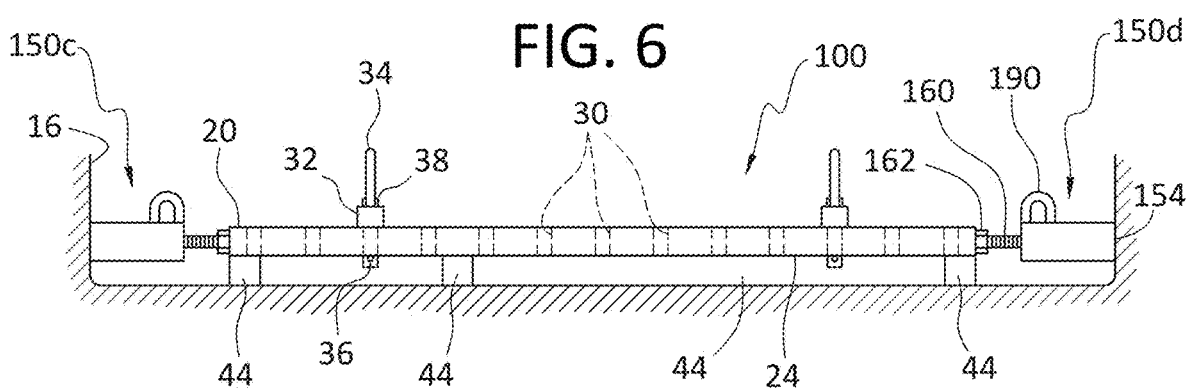
FIG. 7 is an end view of the rack system of FIG. 6.

Referring next to FIGS. 6 and 7, an alternative rack system 100 according to the invention is installed in a bed of a pick-up truck 12 by bracing a panel 20 between the sidewalls 16 with two pairs of locking wedges 150sa, 150b, 150c, 150d. In this embodiment, the locking wedges 150 each have a first end, and an opposite end. Each locking wedge 150 defines an axis, and has an internally threaded bore 158 extending along the axis into the locking wedge, with the internally threaded bore opening at the first end. The internally threaded bore 158 is configured to mate with a threaded fastener 160, such as a bolt as shown in FIGS. 6 and 7, that may be loosened or tightened by turning a locking nut 162 engaged thereto. The first end of the threaded fastener 160 is matingly secured to the internally threaded bore 158 and the opposite end of the threaded fastener 160 contacts a side edge (either the left side edge 26 or the right side edge 28 of the panel 20). The length of the threaded fastener 160 extending out of the threaded bore 158 is adjusted by turning the locking nut 162.

The opposite or second end 154 of the locking wedge 150 contacts one respective sidewall 16 of the pick-up truck bed. A first pair of locking wedges 150a, 150b is installed opposite to one another between the respective side edges 26, 28 of the panel 20 and the respective sidewalls 16 of the pick-up truck bed. By increasing or decreasing the portions of the respective threaded fasteners 160 extending out of the threaded bores 158 of the locking wedges 150a, 150b, the panel 20 is wedgingly braced between the sidewalls 16. A second pair of locking wedges 150c, 150d similarly is installed opposite to one another between the respective side edges 26, 28 of the panel 20 and the respective sidewalls 16 of the pick-up truck bed. The second pair of locking wedges 150c, 150d is spaced apart from the first pair of locking wedges 150a, 150b.

Neither the panel 20 nor the locking wedges 150 penetrate into the floor 14 or the sidewalls 16 or the end gate of the pick-up truck bed. As shown in FIGS. 6 and 7, the panel 20 has stand-offs or feet 44 projecting from the opposite surface 24 of the panel 20. The panel 20 is held over the floor 14 of the pick-up truck bed and rests on the feet 44, while braced by the pairs of locking wedges 150a, 150b, 150c, 150d. The locking wedges 150 thus secure the panel 20 in a floating configuration without penetrating truck surfaces.

In the embodiment shown, the locking wedges 150 include securements or D-rings 190 that project from an external surface of each locking wedge 150. In this manner, cargo may be lashed to the rack system 100 not only by lashing to the securements 34 of retractable pins 32 mating with the bore holes 30 through the panel 20, but also by lashing with cable or strapping or bungie cords to the securement 190 on the locking wedge 150.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

REFERENCE NUMERALS 10 rack system
12 pick-up truck
14 truck bed floor
16 truck bed sidewall
18 truck end gate
20 panel
22 top surface of panel
24 bottom surface of panel
26 left side edge of panel
28 right side edge of panel
30 bore hole
32 reractable pin that mates with bore hole
34 D-ring associated with retractable pin
36 locking bearing detent on retractable pin
38 release button on retractable pin
40 ring fixture (D-ring)
40a, 40b, 40c, 40d ring fixtures on truck side walls
44 stand off or foot on panel
50 locking wedge
50a, 50b, 50c, 50d locking wedges
52 first end
54 opposite end from first end
56 axis of locking wedge
58 internally threaded bore
60 threaded fastener/bolt
62 locking nut
64 end of threaded fastener/bolt
66 arm at end of locking wedge
68 arm at end of locking wedge
70 channel between arms at end of locking wedge
72 bore hole through arms at end of locking wedge
74 axis of bore hole through arms at end of locking wedge
80 removable pin locking into bore hole through arms at end of locking wedge
80a, 80b, 80c, 80d removable pins locking into bore holes of locking wedges
90 securement/ring/D-ring extending from locking wedge
100 rack system
150 locking wedge
150a, 150b, 150c, 150d locking wedges
154 opposite end of locking wedge
158 internally threaded bore
160 threaded fastener/bolt
162 locking nut
190 securement/ring/D-ring extending from locking wedge

The invention claimed is:

1. A rack system for a bed of a pick-up truck, comprising:
a panel having a top surface, a bottom surface opposite the top surface and defining a plurality of bore holes through the panel thickness, said panel having a left side edge, a right side edge, a front edge and a rear edge;
a first locking wedge having a first end and an opposite end, and defining a first locking wedge axis between the first end and the opposite end, said first locking wedge having an internally threaded bore with an opening at the first end and extending along a portion of the first axis, said first locking wedge defining a channel at its opposite end, said channel configured to receive a portion of a first ring fixture extending from the pick-up truck bed, and said first locking wedge defining a first locking wedge bore hole near the opposite end and with a bore axis that is perpendicular to or substantially perpendicular to the first locking wedge axis;
a first externally threaded fastener having a first end and a second end, wherein the first end is threadably joined with the internally threaded bore of the first locking wedge and wherein the second end contacts either the left side edge or the right side edge of the panel;
a first locking pin removably insertable into the first locking wedge bore hole and through the first ring fixture extending from the pick-up truck bed;
a second locking wedge having a first end and an opposite end, and defining a second locking wedge first axis between the first end and the opposite end, said second locking wedge having an internally threaded bore with an opening at the second locking wedge first end and extending along a portion of the second locking wedge first axis, said second locking wedge defining a second locking wedge channel at its opposite end, said second locking wedge channel configured to receive a portion of a second ring fixture extending from the pick-up truck bed, and said second locking wedge defining a second locking wedge bore hole near the opposite end and with a second locking wedge bore axis that is perpendicular to or substantially perpendicular to the second locking wedge first axis;
a second externally threaded fastener having a first end and a second end, wherein the first end is threadably joined with the internally threaded bore of the second locking wedge and wherein the second end contacts a respective other one of the left side edge or the right side edge of the panel; and
a second locking pin removably insertable into the second locking wedge bore hole and through the second ring fixture extending from the pick-up truck bed;
wherein a portion of the length of the first externally threaded fastener that extends out of the first locking wedge may be varied by rotation of the first externally threaded fastener, and wherein a portion of the length of the second externally threaded fastener that extends out of the second locking wedge may be varied by rotation of the second externally threaded fastener so as to removably brace the panel to the pick-up truck bed between the first locking wedge and the second locking wedge.

2. The rack system of claim 1, further comprising a first locking nut operatively secured to the first externally threaded fastener.

3. The rack system of claim 2, further comprising a second locking nut operatively secured to the second externally threaded fastener.

4. The rack system of claim 1, further comprising a plurality of feet or standoffs extending from the bottom surface of the panel.

5. The rack system of claim 1, further comprising a first securement on or extending from the first locking wedge, said first securement configured to receive cording or lashing strapping.

6. The rack system of claim 5, further comprising a second securement on or extending from the second locking wedge, said second securement configured to receive cording or lashing strapping.

7. The rack system of claim 1, further comprising at least one retractable pin configured to mate with a respective one of the plurality of bore holes of the panel.

8. The rack system of claim 7, wherein a securement projects from the retractable pin, said securement configured to receive cording or lashing strapping.

9. The rack system of claim 7, wherein the retractable pin has two or more locking bearing detents projecting from a sidewall of said retractable pin.

10. The rack system of claim 9, wherein the retractable pin has a release button to release the locking bearing detents.

11. The rack system of claim 1, wherein the first ring fixture extending from the pick-up truck bed is a D-ring.

12. The rack system of claim 1, further comprising a first tightening nut engaged with the first fastener and a second tightening nut engaged with the second fastener.

13. The rack system of claim 1, wherein the panel is pegboard.

14. The rack system of claim 1, wherein the panel is formed of a material selected from the group consisting of: perforated hardboard, thermoplastic, and metal.

15. A rack system for a bed of a pick-up truck, comprising:
a panel having a top surface, a bottom surface opposite the top surface and defining a plurality of bore holes through the panel thickness, said panel having a left side edge, a right side edge, a front edge and a rear edge;
a first locking wedge having a first end and an opposite end, and defining a first locking wedge axis between the first end and the opposite end, said first locking wedge having an internally threaded bore with an opening at the first end and extending along a portion of the first axis, wherein the opposite end is configured to contact a first sidewall of the pick-up truck bed;
a first externally threaded fastener having a first end and a second end, wherein the first end is threadably joined with the internally threaded bore of the first locking wedge and wherein the second end contacts either the left side edge or the right side edge of the panel;
a second locking wedge having a first end and an opposite end, and defining a second locking wedge first axis between the first end and the opposite end, said second locking wedge having an internally threaded bore with an opening at the second locking wedge first end and extending along a portion of the second locking wedge first axis, wherein the opposite end of the second locking wedge is configured to contact a second sidewall of the pick-up truck bed; and
a second externally threaded fastener having a first end and a second end, wherein the first end is threadably joined with the internally threaded bore of the second locking wedge and wherein the second end contacts a respective other one of the left side edge or the right side edge of the panel;
wherein a portion of the length of the first externally threaded fastener that extends out of the first locking wedge may be varied by rotation of the first externally threaded fastener, and wherein a portion of the length of the second externally threaded fastener that extends out of the second locking wedge may be varied by rotation of the second externally threaded fastener so as to removably brace the panel to the pick-up truck bed between the first locking wedge and the second locking wedge.

16. The rack system of claim 15, further comprising a first tightening nut engaged with the first fastener and a second tightening nut engaged with the second fastener.

17. The rack system of claim 15, wherein the panel is pegboard.

18. The rack system of claim 15, further comprising at least one retractable pin configured to mate with a respective one of the plurality of bore holes of the panel, wherein a securement projects from the retractable pin, said securement configured to receive cording or lashing strapping.

19. The rack system of claim 18, wherein the retractable pin has two or more locking bearing detents projecting from a sidewall of said retractable pin.

20. The rack system of claim 15, further comprising a plurality of feet or standoffs extending from the bottom surface of the panel.

21. The rack system of claim 15, further comprising a first securement on or extending from the first locking wedge, said first securement configured to receive cording or lashing strapping.

* * * * *